United States Patent [19]

Willett

[11] Patent Number: 4,538,050
[45] Date of Patent: Aug. 27, 1985

[54] BAKER'S OVEN

[75] Inventor: Paul E. Willett, Clontarf, Australia

[73] Assignee: Baker Perkins Exports Pty. Ltd., Springvale, Australia

[21] Appl. No.: 545,232

[22] Filed: Oct. 25, 1983

[30] Foreign Application Priority Data

Oct. 26, 1982 [AU] Australia ................. PF6504
Sep. 21, 1983 [AU] Australia ................. PG1510

[51] Int. Cl.³ .............. F27B 9/16; A21B 1/22; F27D 11/00
[52] U.S. Cl. ................... 219/388; 219/394; 99/443 C; 432/142
[58] Field of Search ........... 213/388, 394, 391, 389; 99/427, 443 C, 448, 391; 432/128, 138, 142; 126/41 A

[56] References Cited

U.S. PATENT DOCUMENTS

| | | | |
|---|---|---|---|
| 1,384,406 | 7/1921 | Reid | 432/142 |
| 1,433,598 | 10/1922 | Bolling | 432/142 |
| 1,599,556 | 9/1926 | Cook | 126/41 A |
| 1,825,059 | 9/1931 | Grothe | 432/138 |
| 1,957,811 | 5/1934 | Stalle | 432/142 |
| 2,964,609 | 12/1960 | Anoff | 219/394 |
| 4,238,669 | 12/1980 | Huntley | 219/391 |
| 4,350,873 | 9/1982 | Willett | 219/388 |

*Primary Examiner*—Roy N. Envall, Jr.
*Assistant Examiner*—Teresa J. Walberg
*Attorney, Agent, or Firm*—Kimmel, Crowell & Weaver

[57] ABSTRACT

A baker's oven has an insulated casing arranged into two series of cylindrical compartments, coaxially one above the other, and separated by horizontal heat-insulating decks. A loading door is provided for each compartment, together with top and bottom heating elements. A vertical drive shaft passes coaxially through each series of compartments and a rotary support, for products to be baked, is mounted on the shaft in each compartment. In one or more of the compartments, a pair of vertically spaced rotary supports may be provided on the shaft and an intermediate heating element is provided below the upper of the two supports.

5 Claims, 4 Drawing Figures

BAKER'S OVEN

BACKGROUND OF THE INVENTION

1. Field of the Invention

This invention relates to a baker's oven.

2. Brief Description of the Prior Art

A well-known type of baker's oven has, within an insulating casing, a number of substantially cylindrical compartments one above the other, separated by insulating decks, each of the compartments being accessible, for loading and unloading, by way of a passage with a hinged door, at the front of the casing. A shaft extending axially through all of the compartments and driven by a motor carries, in each compartment, a circular support or turntable for articles to be baked, and each compartment is heated individually by thermostatically controlled electric heating elements under the top and upon the bottom of the compartment. Bread baking tins, or trays, carrying bakery products, may be loaded onto or unloaded from each compartment's turntable support.

Ovens of this type have proved to be successful, but although such an oven will generally occupy less floor area than a conventional baker's oven of similar capacity, its width is likely to be such that it cannot, in some cases, be passed through the doorway of an existing bakery for installation.

SUMMARY OF THE PRESENT INVENTION

One of the main objects of the present invention is to provide a baker's oven having the principal advantages of an oven of the type described, but which is of such construction that its depth, from front to back, is very considerably reduced so that it can be moved easily through the door space generally available.

Another object of the invention is to provide such an oven which, though having a large capacity for bakery products, is very compact and economical to manufacture, and of such height as to make the loading and unloading of all of the oven compartments easy and convenient.

Accordingly, the invention resides broadly in a baker's oven including a casing; two adjacent series of oven compartments within and insulated from the casing; the compartments of each series being substantially cylindrical, arranged coaxially one above the other, and separated by horizontal heat-insulating decks; a loading passage leading into each one of the oven compartments through the front of the casing; electric heating elements in each of the oven compartments and including top elements mounted under the compartment top and bottom elements mounted on the compartment bottom; a drive shaft passing axially through each series of oven compartments; drive means for simultaneously driving the two drive shafts; and within each oven compartment, a rotary support for products to be baked, mounted upon the drive shaft passing through the compartment.

Preferably at least one of the oven compartments contains a second rotary support mounted upon the drive shaft passing through the compartment; the two rotary supports being spaced one above the other; and intermediate electric heating elements are mounted within the said compartment below the upper, and above the lower, of the two rotary supports. Other features of the invention will become apparent from the following description.

BRIEF DESCRIPTION OF THE VIEWS OF THE DRAWINGS

In order that a preferred embodiment of the invention may be readily understood and carried into practical effect, reference is now made to the accompanying drawings, wherein.

DETAILED DESCRIPTION OF THE PREFERRED EMBODIMENTS

Figure 1:
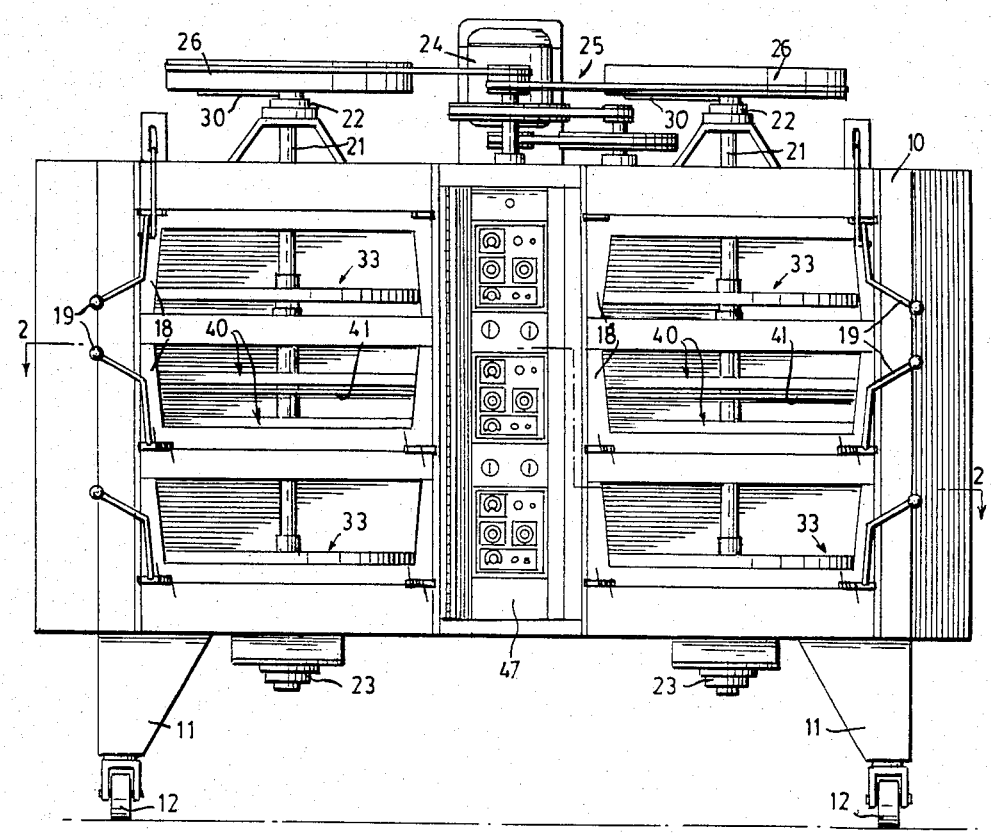
FIG. 1 is a front elevational view of a baker's oven according to the invention.

The baker's oven illustrated has a casing 10 mounted on legs 11 with castors 12. Within the casing are two adjacent series of substantially cylindrical sheet-metal oven compartments 13. The three compartments of each series are arranged coaxially one above the other, and are reinforced and also spaced apart and spaced from the top and the bottom of the outer casing 10, by assemblies of angle members 14, welded to the top and bottom plates 15 and 16 of the compartments.

A parallel-sided loading passage 17 leads into each of the oven compartments 13 through the front of the casing 10, and each of these loading passages is provided with a hinged oven door 18, consisting of a glass panel in a metal frame. Each door is spring-loaded to its closed position and may be conveniently opened by a handle 19.

Insulating material indicated at 20 is interposed between the casing 10 and the oven compartments 13 and is also packed between the spaced oven compartments 13 of each series of compartments so that succeeding compartments of each series are separated by an insulating deck consisting of the bottom plate 15 of the one, the top plate 16 of the other, and the interposed insulating material 20.

A drive shaft 21 passes coaxially through the compartments 13 of each series, and is rotatable in top and bottom bearings mounted on the top and bottom of the casing 10 and indicated at 22 and 23 respectively. An electric motor 24 mounted above the casing 10 acts, through a belt and pulley assembly 25, to rotate simultaneously two large drive wheels 26 on the two drive shafts 21. The drive wheels are freely rotatable on the shafts 21, but on each wheel a small roller 27, on an arm 28 pivoted at one end on the wheel rim and biased to radial position by a spring 29, is arranged to contact a radius arm 30 fixed to and extending from the shaft 21. Normally the wheel 26 acts through the roller 27 and the radius arm 30 to drive the drive shaft 21, but the shaft can be counter-rotated or held stationary, the radius arm displacing the spring loaded roller 27, without the drive from the motor 24 being interrupted. More particularly, when one of the shafts 21 is braked, as during loading or unloading of bake goods, the corresponding radial arm 30 becomes stationary while the corresponding large wheel 26 continues to rotate with the roller 27, pivoted arm 28 and tension spring 29. During such rotation, the roller 27 simply yields and trips over the outer end of arm 30 without inducing rotation of the shaft 21. When braking action on the shaft 21 is released, the normal driving of the shaft by the engagement of the roller 27 with the arm 30 resumes.

Each of the oven compartments 13 is heated individually by thermostatically controlled electric heating elements including top heating elements 31 fixed under the compartment top plate 15 and bottom heating elements 32 fixed above the compartment bottom plate 16. Each of these heating elements is of the tube-enclosed type, and is doubled and then shaped to form part of a spiral, curving from the periphery of the compartment to a position near to the drive shaft 21.

In each of the upper and lower oven compartments 13 of each series a turntable 33 is fixed on a drive shaft 21. Each of these turntables includes a hub 34 with three main spokes 35 and a number of secondary spokes 36 radiating to pass through an inner ring 37 and fixed to a circular rim 38. A sector-shaped part of the turntable between two of the main spokes 35 is removable, being detachable secured to these spokes at 39, the removable part including the secondary spokes between these two main spokes and an arcuate part of the inner ring 37.

Figure 2:
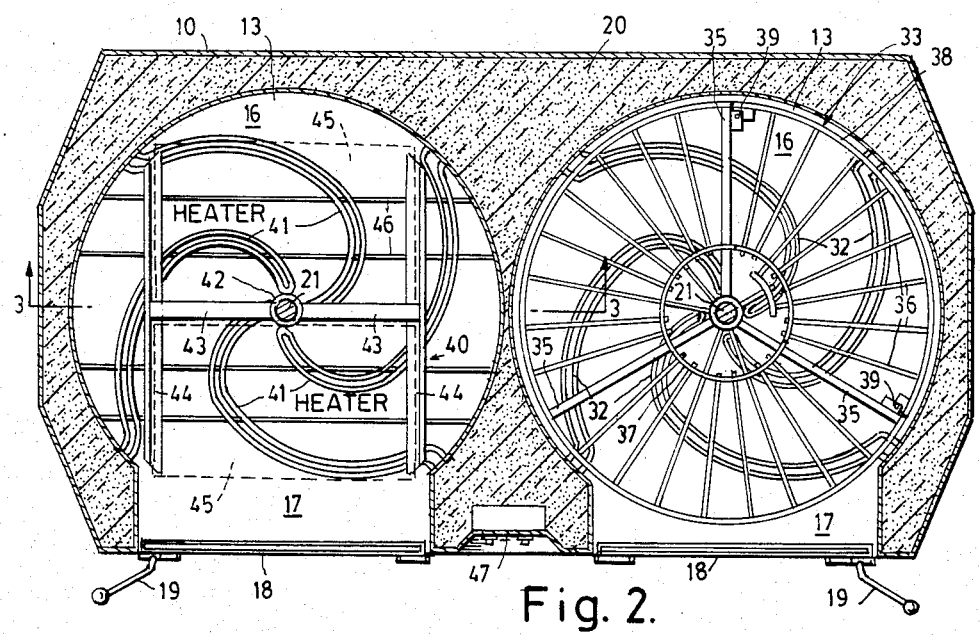
FIG. 2 is a sectional view of the oven along line 2—2 in FIG. 1.
Figure 3:
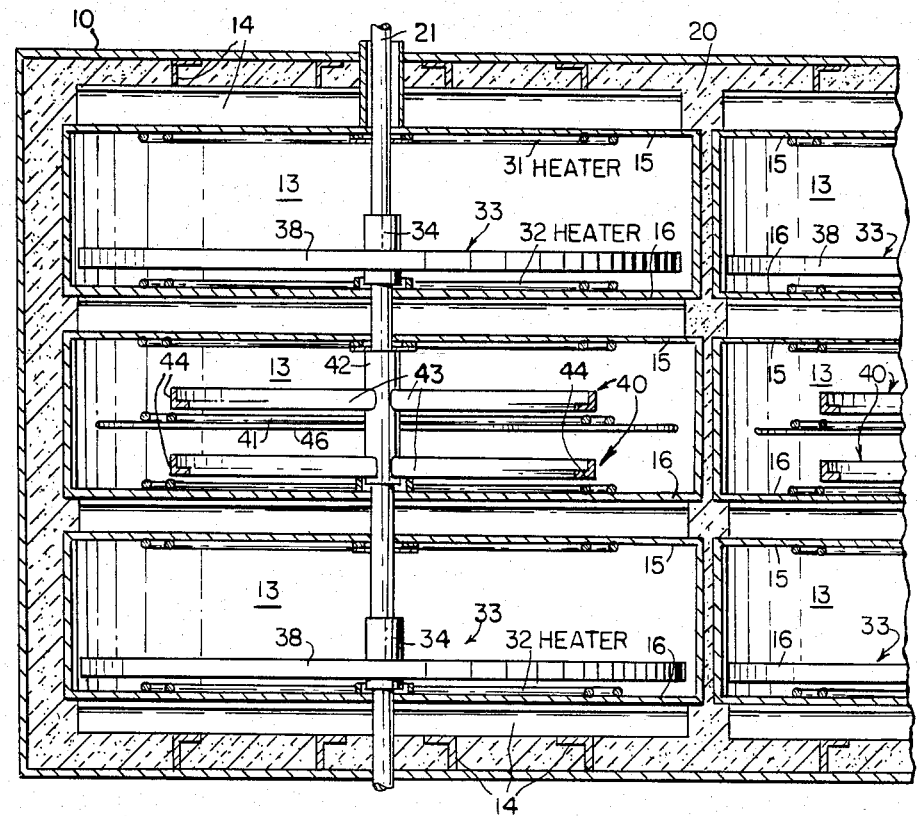
FIG. 3 is a sectional view, to larger scale, along line 3—3 in FIG. 2
Figure 4:
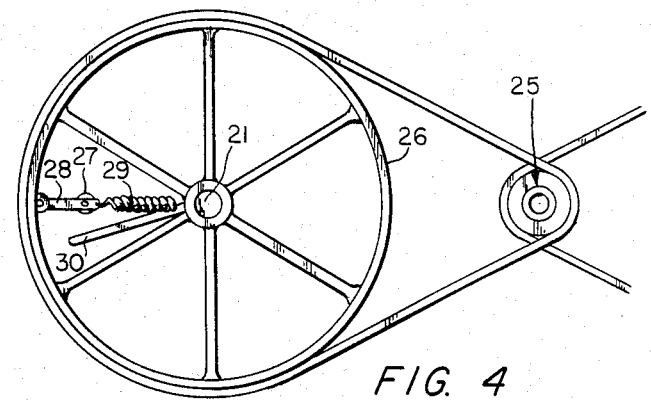
FIG. 4 is a detail plan view of the drive to one of the drive shafts of the oven.

Each of the middle oven compartments 13 of the two series of compartments is equipped differently from the upper and lower oven compartments in that two rotary tray supports 40 are mounted one above the other on the drive shaft 21 instead of a single turntable 33, and an intermediate set of heating elements 41 is installed. Each of the tray supports is H-shaped in plan view, consisting of a central hub 42 with two horizontal arms 43 extending radially in opposite directions, their outer ends being secured perpendicularly to the middles of a pair of angle members 44, the lower flanges of which will support the sides of a pair of baking trays indicated in broken outline at 45 in FIG. 2 and which, as shown, are close to and on opposite sides of the shaft 21. The intermediate heating elements 41 are of greater heating capacity than, but otherwise generally similar to, the top and bottom heating elements 31 and 32 before described, and are supported on transverse rods 46 so as to be located a short distance below the upper tray support 40.

The various electric controls and meters of the oven are mounted on a recessed central front instrument panel 47 of the casing 10.

In use, fairly low bakery products, such as bread rolls, french loaves and the like are baked on baking trays 45 installed on the two tray supports 40 of each of the two middle oven compartments. Higher bakery products, such as most kinds of bread loaves, are baked in tins or on trays supported on the turntables 33 of the top and bottom oven compartments.

To facilitate the loading and unloading of baking trays onto and from the tray supports 40, any suitable braking means (not shown) may be provided for bringing the drive shafts 21 to rest with the tray supports conveniently aligned for the insertion of the trays 45 through the loading passages 17 onto the parallel angle members 44 at one side of the tray support and then, after the brake has been released, to bring the supports to rest again after they have been turned through 180°. To prevent overheating of bakery products on the trays carried by the tray supports when the rotation of the shafts 21 is interrupted, it is preferred that automatic switch means should be provided for automatically cutting off electric current to all of the heating lements of the oven when the drive shafts are brought to rest. It will not usually be necessary to interrupt the rotation of the drive shaft 21 while baking tins or trays are loaded onto or unloaded from the turntables 33.

The arrangement, and the relative numbers, of oven compartments equipped with the turntables and with the rotary tray supports may, of course, be varied to suit particular requirements.

Ovens made according to the invention will be found to be very effective in achieving the objects for which they have been devised. It will of course be understood that the particular embodiment of the invention herein described and illustrated may be subject to many modifications of constructional detail and design, which will be readily apparent to skilled persons, without departing from the scope of the invention hereinafter claimed.

I claim:

1. A baker's oven comprising a casing, two adjacent series of oven compartments within and insulated from the casing, the compartments of each series being substantially cylindrical, arranged coaxially one above another, and separated by horizontal heat insulating decks, a loading passage leading into each one of the oven compartments through a front opening of the casing, electric heating elements in each of the oven compartments and including top elements mounted under the heat insulating deck forming the compartment top and bottom elements mounted on the heat insulating deck forming the compartment bottom, a drive shaft passing axially through each series of oven compartments, drive means for simultaneously driving the two drive shafts, a rotary support for products to be baked within each oven compartment and being mounted on the drive shaft passing through the compartment, at lest one of the oven compartments containing a second rotary support mounted on the drive shaft passing through the compartment, the two rotary supports being spaced one above another, intermediate thermostatically controlled electric heating elements mounted within said compartment below an upper one and above a lower one of the two rotary supports, said drive means including a drive wheel rotatably mounted on each of the drive shafts, a motor on the casing, a drive from the motor to both of the drive wheels, and rotation transfer means for transferring rotation of each drive wheel to its drive shaft, such means being yieldable to resistance so that each drive shaft may be restrained from rotating without interrupting the drive from the motor to the drive wheels.

2. A baker's oven according to claim 1 wherein:
each of the two rotary supports within the said compartment includes support members for two baking trays close to, and on opposite sides of, the drive shaft on which the said two rotary supports are mounted.

3. A baker's oven comprising a casing, a pair of adjacent side-by-side upright axis oven compartments within the casing, each oven compartment having a loading and unloading passage, relatively stationary heating elements within the oven compartments, an upright axis drive shaft extending axially through each compartment and being rotatably held in bearings on the casing, a rotary support for products being baked within each oven compartment and being fixed on the drive shaft passing through the compartment, a freely rotatable wheel journaled on each drive shaft, a single power drive means common to the wheels on the drive shafts and causing continuous rotation of the wheels, and cyclically engageable and disengageable independently operable drive components on the drive shafts and wheels normally causing the wheels to turn the drive shafts in unison and being operable to allow the wheels to continue their rotation when a braking force is applied to one or both of the drive shafts to arrest its rotation.

4. A baker's oven as defined in claim 3, and the cyclically engageable and independently operable drive components comprising one rigid component and one yielding component adapted to trip over the rigid component during continuous rotation of said wheels while a braking force is being applied to one or both of said drive shafts.

5. A baker's oven as defined in claim 4, and the rigid component being on each drive shaft and projecting radially therefrom into the path of movement of the yielding component, the yielding component being on and turning with the wheel.

* * * * *